United States Patent
Tang et al.

(10) Patent No.: US 8,570,020 B2
(45) Date of Patent: Oct. 29, 2013

(54) FREQUENCY CONTROL CIRCUIT AND METHOD FOR A NON-CONSTANT FREQUENCY VOLTAGE REGULATOR

(75) Inventors: Chien-Fu Tang, Hsinchu (TW); Isaac Y Chen, Jubei (TW)

(73) Assignee: Richtek Technology Corp., Hsinchu (TW)

(*) Notice: Subject to any disclaimer, the term of this patent is extended or adjusted under 35 U.S.C. 154(b) by 408 days.

(21) Appl. No.: 12/942,228

(22) Filed: Nov. 9, 2010

(65) Prior Publication Data

US 2011/0109291 A1    May 12, 2011

(30) Foreign Application Priority Data

Nov. 11, 2009  (TW) .............................. 098138207 A (51) Int. Cl.
*G05F 1/56*  (2006.01)
(52) U.S. Cl.
USPC ........................................................ 323/285
(58) Field of Classification Search
USPC .......................................... 363/271, 282, 285
See application file for complete search history.

(56) References Cited

U.S. PATENT DOCUMENTS

| | | | |
|---|---|---|---|
| 7,446,520 B2* | 11/2008 | Hung .............................. | 323/288 |
| 2004/0257056 A1* | 12/2004 | Huang et al. ................... | 323/282 |
| 2008/0088284 A1* | 4/2008 | Weng .............................. | 323/271 |
| 2009/0302820 A1* | 12/2009 | Shimizu et al. ................ | 323/285 |
| 2011/0109290 A1* | 5/2011 | Tang et al. ..................... | 323/282 |
| 2011/0109291 A1* | 5/2011 | Tang et al. ..................... | 323/282 |
| 2011/0241641 A1* | 10/2011 | Chen et al. ..................... | 323/284 |
| 2012/0038334 A1* | 2/2012 | Peng et al. ..................... | 323/282 |

* cited by examiner

*Primary Examiner* — Jeffrey Sterrett
(74) *Attorney, Agent, or Firm* — Muncy, Geissler, Olds & Lowe, PLLC (57) ABSTRACT

A non-constant frequency voltage regulator includes a constant-time trigger to trigger a constant on-time or a constant off-time for a pulse width modulation signal, a current generator to provide a first current to determine the constant on-time or the constant off-time, a power output stage operated by the pulse width modulation signal to produce a load current, and a frequency control circuit for loading feed forward by a second current added to the first current to adjust the constant on-time or the constant off-time for frequency compensation to the pulse width modulation signal.

10 Claims, 7 Drawing Sheets

FREQUENCY CONTROL CIRCUIT AND METHOD FOR A NON-CONSTANT FREQUENCY VOLTAGE REGULATOR

FIELD OF THE INVENTION

The present invention is related generally to a non-constant frequency voltage regulator and, more particularly, to a frequency control circuit and method for a non-constant frequency voltage regulator.

BACKGROUND OF THE INVENTION

Figure 1:
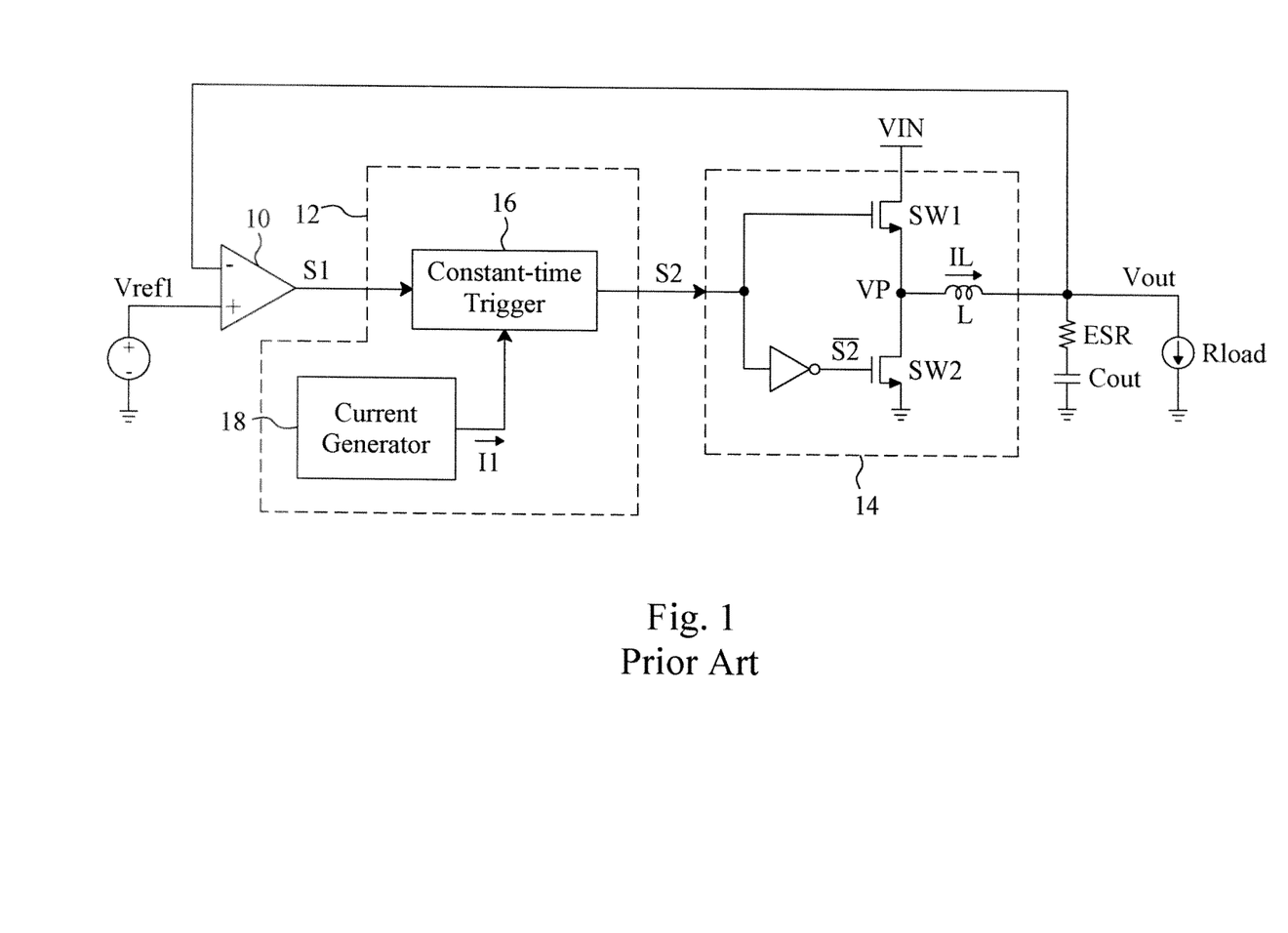
FIG. 1 is a circuit diagram of the basic architecture for constant on-time and constant off-time PWM.
Figure 2:
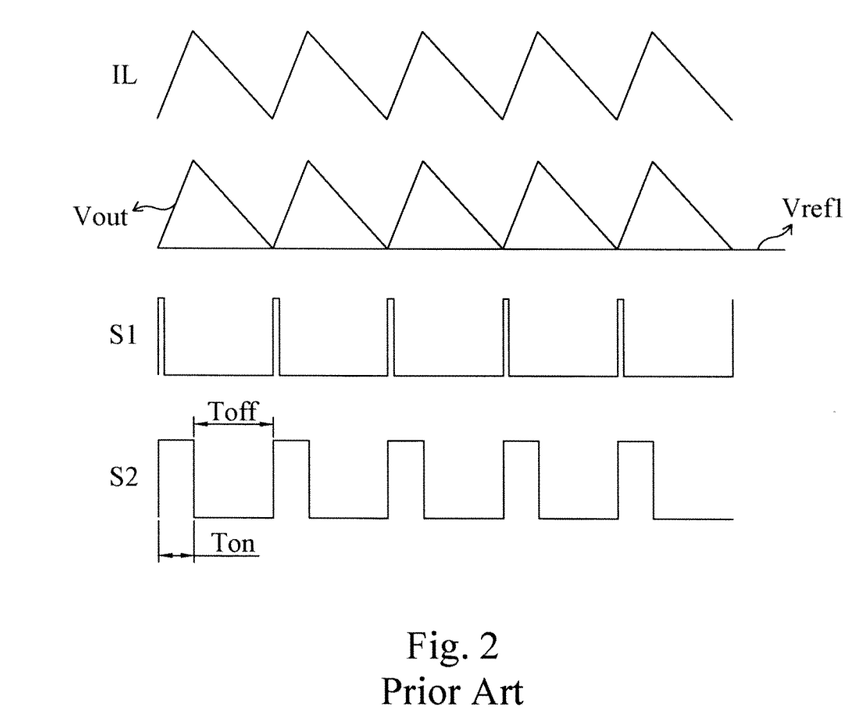
FIG. 2 is a waveform diagram of the circuit shown in FIG. 1.
Figure 3:
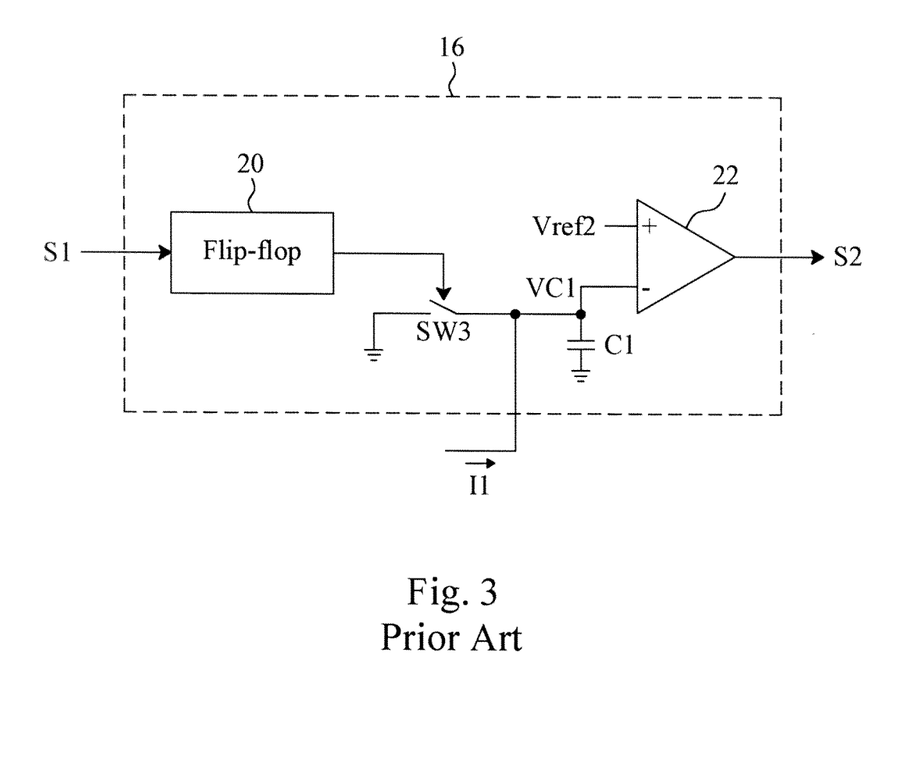
FIG. 3 is a circuit diagram of a constant-time trigger for constant on-time PWM.

If a PWM power converter uses a non-fixed frequency system architecture, such as a constant on-time or constant off-time control system, the frequency of the PWM power converter may deviate from the designed value under different loading and cause new problems. For example, two channels on a printed circuit board (PCB) are designed to operate with a frequency difference of higher than 100 KHz therebetween, but the real operation frequencies of the two channels may quite close to each other under certain loading, thereby causing audio beating. FIG. 1 is a circuit diagram of the basic architecture for constant on-time and constant off-time PWM, and FIG. 2 is a waveform diagram thereof. Referring to FIGS. 1 and 2, a comparator 10 compares the output voltage Vout of the system with a reference voltage Vref1 to generate a comparison signal S1, and a PWM signal generator 12 generates a PWM signal S2 according to the comparison signal S1 to drive a power output stage 14 to convert an input voltage VIN into the output voltage Vout. In the PWM signal generator 12, responsive to the comparison signal S1, a constant-time trigger 16 triggers a constant on-time Ton or a constant off-time Toff, whose width is set by a current I1 provided by a current generator 18. For example, FIG. 3 is a circuit diagram of the constant-time trigger 16 for constant on-time PWM, in which the comparison signal S1 is used to control a switch SW3 and thereby determine the time point at which a capacitor C1 is to be charged, and a comparator 22 compares the capacitor voltage VC1 with a reference voltage Vref2 to generate the PWM signal S2. Once the comparison signal S1 triggers a flip-flop 20 to turn off the switch SW3, the current I1 charges the capacitor C1 and thereby the capacitor voltage VC1 increases from zero at a constant speed. When the capacitor voltage VC1 becomes as high as the reference voltage Vref2, the PWM signal S2 turns off the on-time Ton. As the current I1 is constant, the on-time Ton of the PWM signal S2 has a fixed width. In the system shown in FIG. 1, error under different loading mainly comes from three sources:

(1) The variation of the phase node voltage Vp (=VIN−IL×Ron) with the load current IL, where Ron is the on-resistance of the high side power switch SW1;

(2) The voltage drop (IL×RL) caused by the inductor L and the parasitic resistance RL of the PCB; and (3) The increased frequency caused by the reduced pulse width of the phase node voltage VP resulted from the shorter deadtime time under heavy loading.

U.S. Pat. No. 6,456,050 uses a timing control circuit to generate a timing signal in response to the duty cycle for constant off-time control; however, a fixed frequency is achievable only when the input/output voltage ratio is less than 0.5. U.S. Pat. No. 6,774,611 uses a phase locked loop (PLL) to control the duty cycle of the PWM signal and thus provide precise frequency control, but the circuit is highly complicated.

SUMMARY OF THE INVENTION

An object of the present invention is to provide a frequency control circuit and method for a non-constant frequency voltage regulator.

Another object of the present invention is to provide a circuit and method for loading dependent frequency compensation to a non-constant frequency voltage regulator.

A further object of the present invention is to provide a circuit and method for reduced loading impact on the operating frequency of a non-constant frequency voltage regulator.

According to the present invention, a frequency control circuit for a non-constant frequency voltage regulator includes a current detector to feed back a current representative of the magnitude of the direct-current (DC) component of a load current of the non-constant frequency voltage regulator, and an adder adds the current to a current used to determine a constant on-time or a constant off-time of the non-constant frequency voltage regulator for frequency compensation to the non-constant frequency voltage regulator.

According to the present invention, a frequency control method for a non-constant frequency voltage regulator includes feeding back a current representative of the magnitude of the DC component of a load current of the non-constant frequency voltage regulator, and adding the current to a current used to determine a constant on-time or a constant off-time of the non-constant frequency voltage regulator for frequency compensation to the non-constant frequency voltage regulator.

The present invention uses loading feed forward technique for frequency compensation to a non-constant frequency voltage regulator, thereby reducing the frequency error resulted from the phase node voltage of the non-constant frequency voltage regulator and from the parasitic resistors of the inductor in the non-constant frequency voltage regulator and of the printed circuit board. Moreover, since the current fed back from the load current is directly added to the current used to determine the constant on-time or constant off-time of a non-constant frequency voltage regulator, the required circuit is simple.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
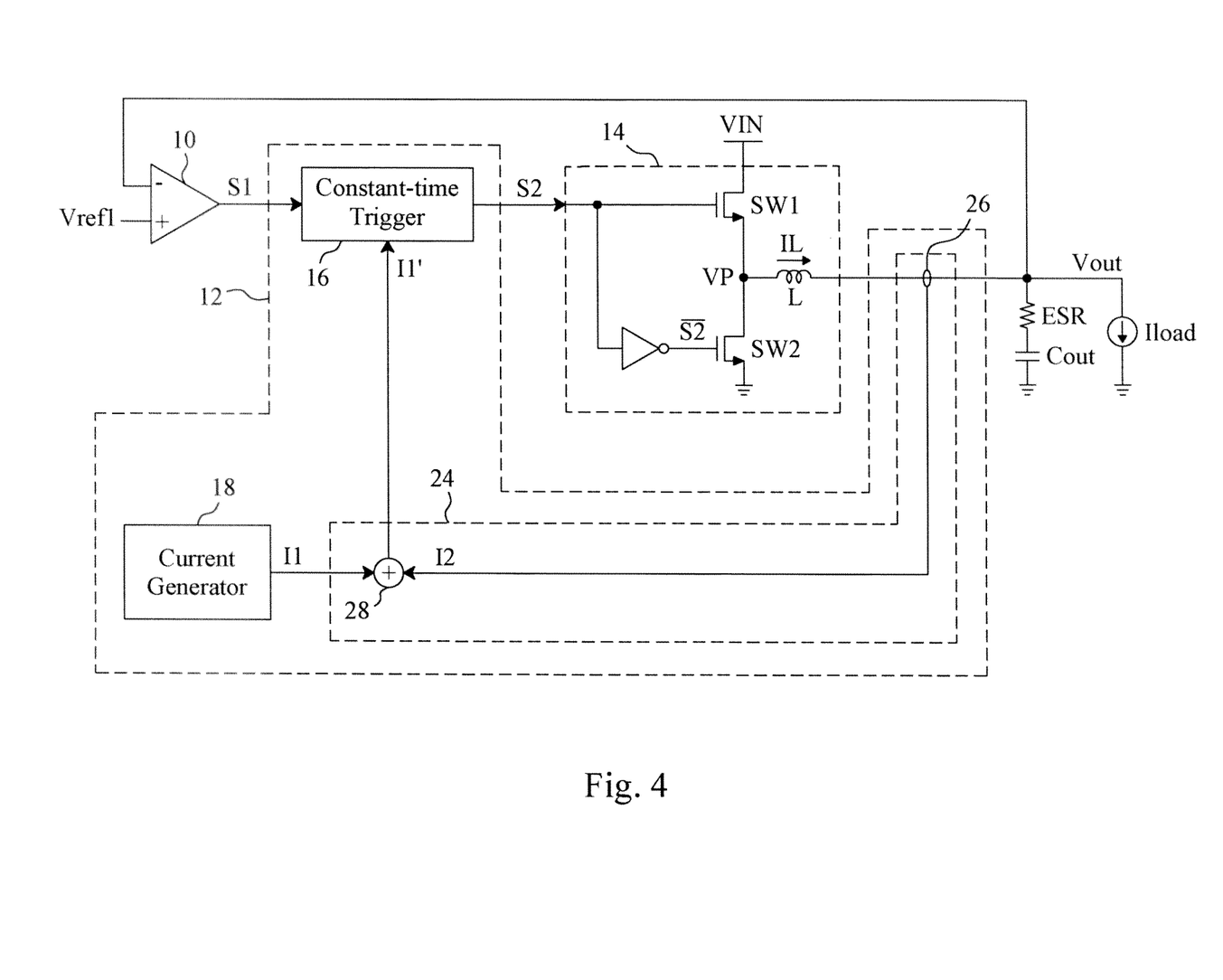
FIG. 4 is a circuit diagram of an embodiment according to the present invention.

FIG. 4 is a circuit diagram of an embodiment according to the present invention, in which the PWM signal generator 12 includes a frequency control circuit 24 in addition to the constant-time trigger 16 and the current generator 18. The frequency control circuit 24 adjusts the first current I1 supplied to the constant-time trigger 16 to be a current I1' for frequency compensation to the PWM signal S2. In the frequency control circuit 24, a current detector 26 detects the load current IL of the non-constant frequency voltage regulator to feed back a second current I2 representative of the magnitude of the DC component of the load current IL, and an adder 28 adds the second current I2 to the first current I1 to generate the current I1' to be supplied to the constant-time trigger 16. After adjusted by the second current I2, the current I1' supplied to the constant-time trigger 16 is related to the level of the load current IL, and thus, as shown in FIG. 3 for example, the constant on-time Ton or the constant off-time Toff generated by the constant-time trigger 16 is adjusted to change the frequency of the PWM signal S2. This technique using the current detector 26 to feed forward the information of the load current IL for frequency compensation is called loading feed forward. As the first current I1 is constant, the variation of the second current I2 will cause the current I1' to vary correspondingly, and consequently the constant on-time Ton or the constant off-time Toff of the PWM signal S2 is adjusted to reduce the frequency error resulted from the phase node voltage VP and from the parasitic resistors of the inductor L and of the printed circuit board.

There are many circuits can be used to implement the current detector 26 shown in FIG. 4. In the embodiment shown in FIG. 5, for example, a DC resistance detection circuit 30 is connected to the power output stage 14 to extract the magnitude of the DC component of the load current IL. The DC resistance detection circuit 30 includes serially connected RC network parallel connected to the inductor L, in which the voltage across the capacitor Cs represents the magnitude of the DC component of the load current IL. This voltage across the capacitor Cs is amplified by an amplifier 32 into a voltage V1, and further amplified by a changeable gain amplifier 34 into a voltage V2. In this embodiment, the changeable gain amplifier 34 is an inverting amplifier configured with an operational amplifier 36 and resistors R1 and R2, whose generated voltage V2 is converted by an operational transconductance amplifier 38 into the second current I2. FIG. 6 is a diagram showing the curves of frequency to loading in the non-constant frequency voltage regulator of FIG. 5. As shown by the curve 40, the loading level has a significant impact on the operating frequency without any feed forward of information from the load current IL. However, after loading feed forward to compensate for the operating frequency, the impact of the loading level on the operating frequency is reduced, as shown by the curves 42 and 44. When the changeable gain amplifier 34 has unit gain, such as by setting R2=R1 in FIG. 5, the variation of the operating frequency with the load current IL is significantly subdued, as shown by the curve 42. When the gain of the changeable gain amplifier 34 is increased to two, such as by setting R2=2R1 in FIG. 5, the operating frequency remains substantially unchanged over a very wide range of the load current IL, as shown by the curve 44. Therefore, by adjusting the ratio between the resistors R1 and R2, the gain of the changeable gain amplifier 34 can be adjusted to compensate for the operating frequency of the non-constant frequency voltage regulator to different degrees.

Figure 5:
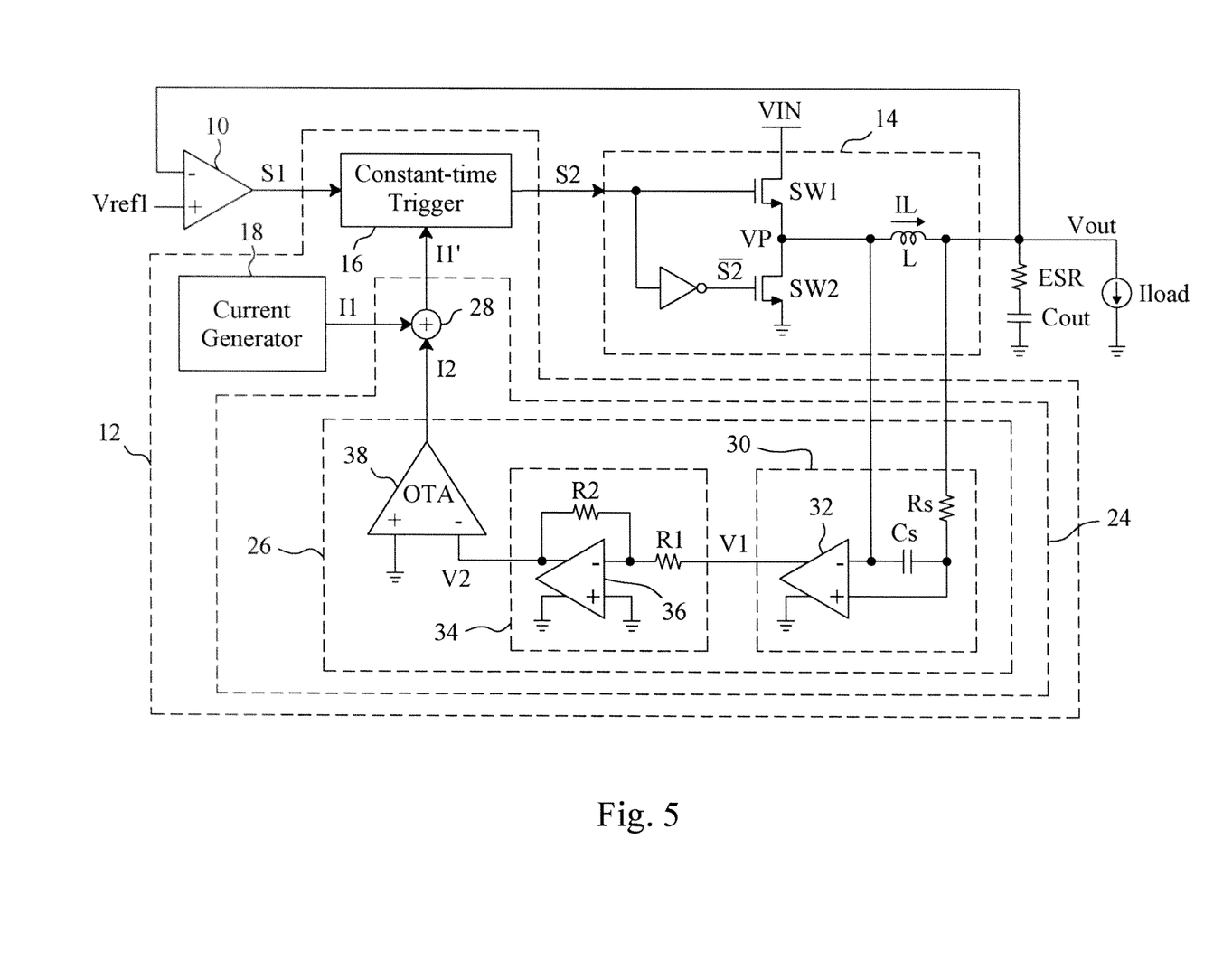
FIG. 5 is a circuit diagram of a first embodiment for the current detector shown in FIG. 4.
Figure 6:
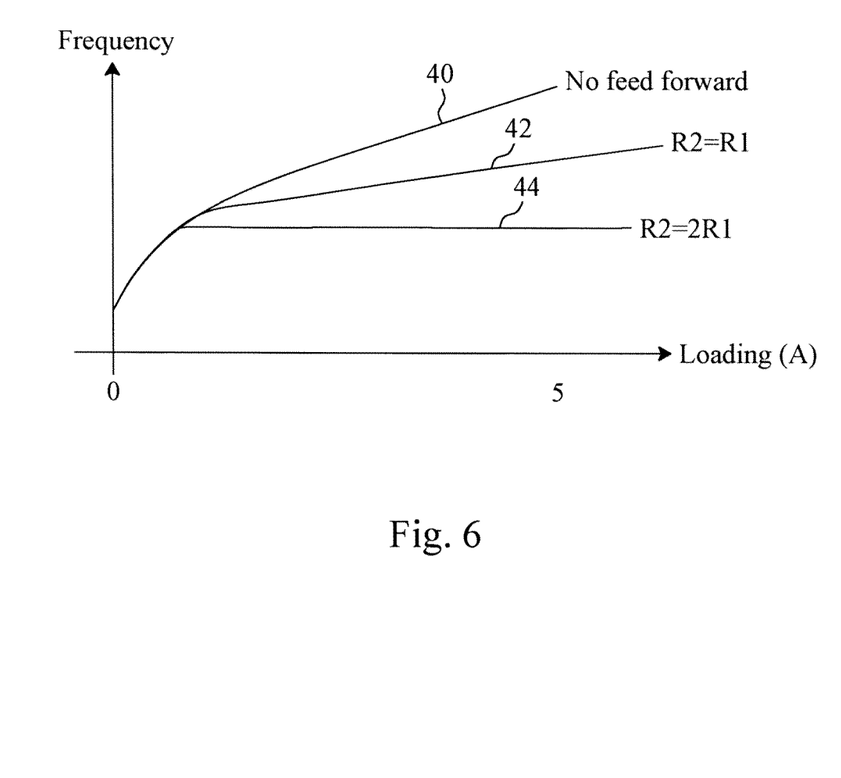
FIG. 6 is a diagram showing the curves of frequency to loading in the non-constant frequency voltage regulator of FIG. 4.
Figure 7:
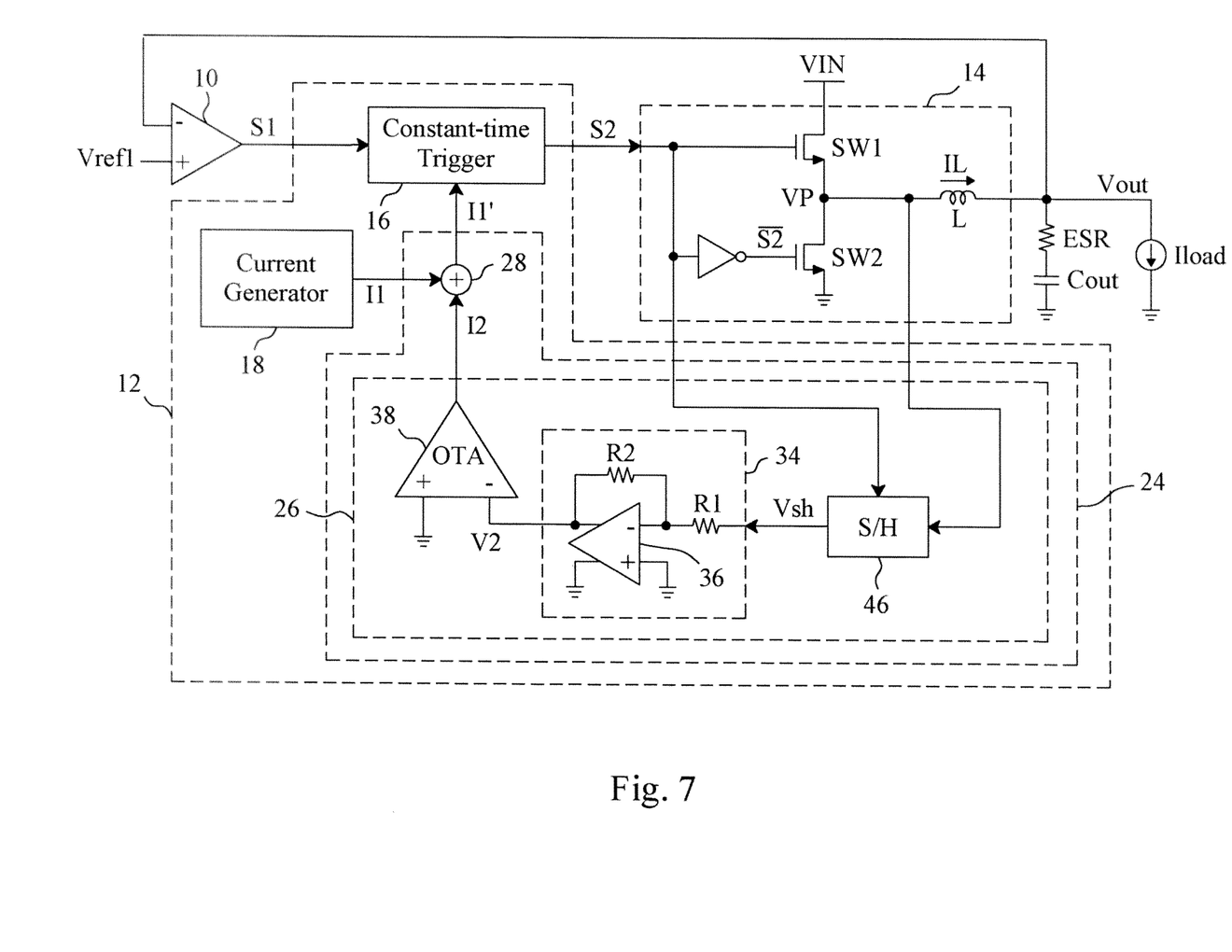
FIG. 7 is a circuit diagram of a second embodiment for the current detector shown in FIG. 4.

FIG. 7 is a circuit diagram of a second embodiment for the current detector 26 shown in FIG. 4, in which the changeable gain amplifier 34 and the operational transconductance amplifier 38 are the same as in the embodiment of FIG. 5; however, a sample and hold circuit 46 is used to sample the phase node voltage VP to generate a first voltage Vsh. The PWM signal S2 is applied to the sample and hold circuit 46 as a sampling clock signal, thus allowing the sample and hold circuit 46 to sample the phase node voltage VP=VIN−IL× Ron when the high side power switch SW1 is on. As the input voltage VIN and the on-resistance Ron of the high side power switch SW1 can be considered as fixed values, the phase node voltage VP is negatively correlated to the load current IL. Hence, the first voltage Vsh obtained by sampling the phase node voltage VP with the sample and hold circuit 46 is related to the load current IL.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A frequency control circuit for a non-constant frequency voltage regulator including a constant-time trigger to trigger a constant on-time or a constant off-time for a pulse width modulation signal, a current generator to provide a first current for the constant-time trigger to determining a width of the constant on-time or the constant off-time, and a power output stage operated by the pulse width modulation signal to generate a load current, the frequency control circuit comprising:
   a current detector connected to the power output stage, for feeding back a second current representative of a magnitude of a DC component of the load current; and
   an adder connected to the current generator, the current detector and the constant-time trigger, for adding the second current to the first current to adjust the width of the constant on-time or the constant off-time for frequency compensation to the pulse width modulation signal.

2. The frequency control circuit of claim 1, wherein the current detector comprises:
   a DC resistance detection circuit connected to the power output stage, for extracting the magnitude of the DC component of the load current to generate a first voltage;
   a changeable gain amplifier connected to the DC resistance detection circuit, for amplifying the first voltage to generate a second voltage; and
   an operational transconductance amplifier connected to the changeable gain amplifier, for converting the second voltage into the second current.

3. The frequency control circuit of claim 2, wherein the changeable gain amplifier comprises two resistors and an operational amplifier configured as an inverting amplifier.

4. The frequency control circuit of claim 1, wherein the current detector comprises:
   a sample and hold circuit connected to the constant-time trigger and the power output stage, for sampling a phase node voltage of the power output stage to generate a first voltage, wherein the sample and hold circuit uses the pulse width modulation signal as a sampling clock signal;
   a changeable gain amplifier connected to the sample and hold circuit, for amplifying the first voltage to generate a second voltage; and
   an operational transconductance amplifier connected to the changeable gain amplifier, for converting the second voltage into the second current.

5. The frequency control circuit of claim 4, wherein the changeable gain amplifier comprises two resistors and an operational amplifier configured as an inverting amplifier.

6. A frequency control method for a non-constant frequency voltage regulator including a constant-time trigger to trigger a constant on-time or a constant off-time for a pulse width modulation signal, a current generator to provide a first current for the constant-time trigger to determining a width of the constant on-time or the constant off-time, and a power output stage operated by the pulse width modulation signal to generate a load current, the frequency control method comprising the steps of:
- (A) from the power output stage, feeding back a second current representative of a magnitude of a DC component of the load current; and
- (B) adding the second current to the first current to adjust the width of the constant on-time or the constant off-time for frequency compensation to the pulse width modulation signal.

7. The frequency control method of claim 6, wherein the step A comprises the steps of:
- extracting from the power output stage the magnitude of the DC component of the load current to generate a first voltage;
- amplifying the first voltage to be a second voltage; and
- converting the second voltage into the second current.

8. The frequency control method of claim 7, further comprising the step of adjusting a gain of the second voltage to the first voltage to adjust the frequency compensation to the pulse width modulation signal.

9. The frequency control method of claim 6, wherein the step A comprises the steps of:
- sampling a phase node voltage of the power output stage to generate a first voltage, wherein the pulse width modulation signal is used as a sampling clock signal;
- amplifying the first voltage to be a second voltage; and
- converting the second voltage into the second current.

10. The frequency control method of claim 9, further comprising the step of adjusting a gain of the second voltage to the first voltage to adjust the frequency compensation to the pulse width modulation signal.

* * * * *